(12) United States Patent
Lu et al.

(10) Patent No.: US 7,590,321 B2
(45) Date of Patent: Sep. 15, 2009

(54) MID-SPAN BREAKOUT WITH HELICAL FIBER ROUTING

(75) Inventors: Yu Lu, Westborough, MA (US); Keith Millea, Sutton, MA (US); Jeff Gniadek, Northbridge, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/491,428

(22) Filed: Jul. 21, 2006

(65) Prior Publication Data

US 2007/0212005 A1 Sep. 13, 2007

Related U.S. Application Data

(60) Provisional application No. 60/781,622, filed on Mar. 9, 2006.

(51) Int. Cl.
*G02B 6/04* (2006.01)
*G02B 6/12* (2006.01)

(52) U.S. Cl. .......................................... 385/104; 385/14

(58) Field of Classification Search ................. 385/104, 385/14
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Paget et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,498,732 A | 2/1985 | Campbell et al. | |

(Continued)

FOREIGN PATENT DOCUMENTS

DE 35 37 684 A1 4/1987

(Continued)

OTHER PUBLICATIONS

"Cable Assemblies: Molding & Termination," http://www.dgo.com/prodcable.htm, 8 pages (Copyright 2001).

(Continued)

*Primary Examiner*—K. Cyrus Kianni
(74) *Attorney, Agent, or Firm*—Merchant & Gould P.C.

(57) ABSTRACT

A mid-span breakout arrangement includes a distribution cable and a tether cable. The distribution cable has a breakout access location. The tether cable is secured to the distribution cable adjacent the breakout access location. The breakout further includes at least one length of optical fiber helically wrapped around the distribution cable along the breakout access location. The length of optical fiber is coupled to the distribution cable and to the tether cable.

15 Claims, 6 Drawing Sheets

U.S. PATENT DOCUMENTS

| | | | |
|---|---|---|---|
| 4,512,628 A | 4/1985 | Anderton |
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,691,081 A * | 9/1987 | Gupta et al. ............ 174/105 R |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 4,985,185 A | 1/1991 | Mayr et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A * | 6/1992 | Edmundson ................ 385/100 |
| 5,185,844 A | 2/1993 | Bensel, III et al. |
| 5,194,692 A | 3/1993 | Gallusser et al. |
| 5,210,812 A * | 5/1993 | Nilsson et al. ............... 385/100 |
| 5,217,808 A | 6/1993 | Cobb |
| 5,241,611 A | 8/1993 | Gould |
| 5,245,151 A | 9/1993 | Chamberlain et al. |
| 5,283,014 A | 2/1994 | Oestreich et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A * | 8/1995 | Ray et al. ................ 385/135 |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A * | 6/1996 | Ray et al. ................... 385/136 |
| 5,657,413 A * | 8/1997 | Ray et al. ................... 385/139 |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,034,002 A * | 3/2000 | Maderek ...................... 442/59 |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 * | 2/2006 | Elkins et al. ................ 385/100 |
| 7,016,592 B2 * | 3/2006 | Elkins et al. ................ 385/136 |
| 7,088,893 B2 * | 8/2006 | Cooke et al. ................ 385/100 |
| 7,155,093 B2 * | 12/2006 | Elkins et al. ................ 385/100 |
| 7,251,411 B1 * | 7/2007 | Lu et al. .................... 385/147 |
| 7,272,282 B1 * | 9/2007 | Seddon et al. ............... 385/106 |
| 7,277,614 B2 * | 10/2007 | Cody et al. ................ 385/100 |
| 7,330,621 B2 | 2/2008 | Elkins, II et al. |
| 2003/0118295 A1 | 6/2003 | Lail et al. |
| 2003/0223219 A1 * | 12/2003 | Ladyjensky .................. 362/34 |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 * | 5/2005 | Cooke et al. ................ 385/100 |
| 2005/0175308 A1 | 8/2005 | Elkins, II et al. |
| 2005/0180705 A1 * | 8/2005 | Elkins et al. ................ 385/100 |
| 2005/0259928 A1 * | 11/2005 | Elkins et al. ................ 385/100 |
| 2005/0259929 A1 | 11/2005 | Elkins, II et al. |
| 2005/0259930 A1 | 11/2005 | Elkins, II et al. |
| 2005/0276552 A1 * | 12/2005 | Cooke et al. ................ 385/100 |
| 2006/0056782 A1 * | 3/2006 | Elkins et al. ................ 385/100 |
| 2006/0120672 A1 * | 6/2006 | Cody et al. .................. 385/86 |
| 2006/0193575 A1 * | 8/2006 | Greenwood et al. ......... 385/109 |
| 2006/0193594 A1 * | 8/2006 | Greenwood et al. ......... 385/147 |
| 2006/0233509 A1 * | 10/2006 | Ray et al. ................... 385/136 |
| 2007/0025668 A1 * | 2/2007 | Greenwood et al. ......... 385/103 |
| 2007/0098339 A1 * | 5/2007 | Bringuier et al. ............ 385/106 |

FOREIGN PATENT DOCUMENTS

DE          39 02 411 A1      8/1990

| | | |
|---|---|---|
| EP | 0 115 725 A1 | 8/1984 |
| EP | 0 512 811 A1 | 11/1992 |
| EP | 1 052 533 A1 | 11/2000 |
| EP | 1 182 484 A2 | 2/2002 |
| EP | 1 361 465 A1 | 11/2003 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2-278206 | 11/1990 |
| JP | 2001-51131 | 2/2001 |
| JP | 2001-116968 | 4/2001 |
| WO | WO 94/24597 | 10/1994 |
| WO | WO 2005/119322 A1 | 12/2005 |
| WO | WO 2006/044080 A1 | 4/2006 |

OTHER PUBLICATIONS

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

\* cited by examiner

MID-SPAN BREAKOUT WITH HELICAL FIBER ROUTING

CROSS REFERENCE TO RELATED APPLICATIONS

This application claims priority from provisional application Ser. No. 60/781,622, filed Mar. 9, 2006, and which is incorporated herein by reference.

TECHNICAL FIELD

The principles disclosed herein relate to fiber optic cable systems. More particularly, the present disclosure relates to fiber optic cable systems having main cables and branch cables.

BACKGROUND OF THE INVENTION

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable.

Branch cables can manually be separated from a main cable in the field using field splices. Field splices are typically housed within sealed splice enclosures. Manual splicing in the field is time consuming and expensive. In some prior systems, the spliced fibers are positioned to lay straight on one side of the distribution cable. Bending of the distribution cable can cause the fiber to stretch or relax depending on orientation. Bending can cause either fiber breakage or excessive insertion loss due to macrobending.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations.

SUMMARY OF THE INVENTION

Certain aspects of the disclosure relate to mid-span breakout configurations for pre-terminated fiber optic distribution cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION OF THE PREFERRED EMBODIMENT

The present disclosure relates to mid-span breakout arrangements provided on distribution cables. In particular, the present disclosure relates to a mid-span breakout arrangement including optical fibers helically wound around the distribution cable.

Figure 1:
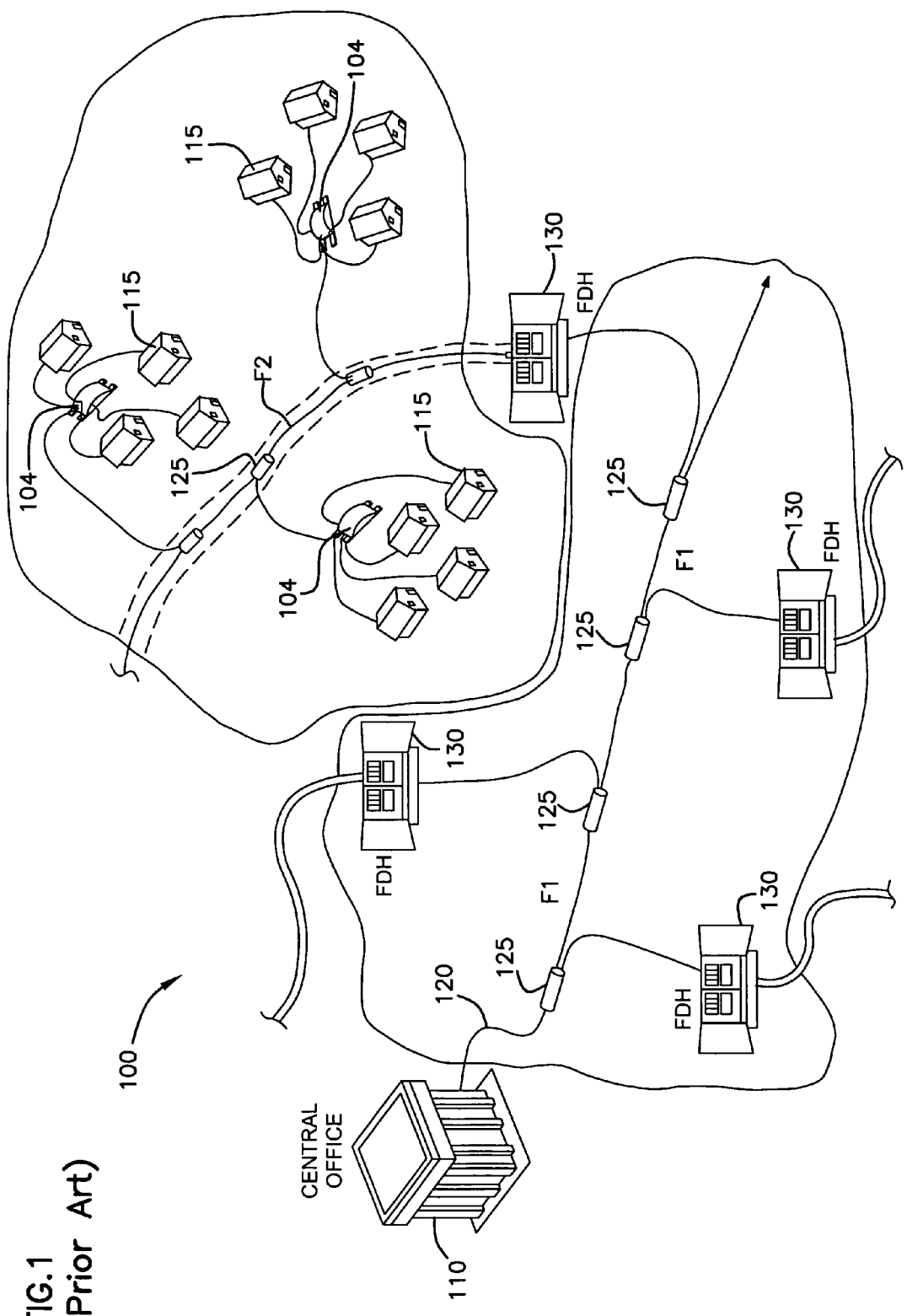
FIG. 1 shows a prior art passive fiber optic network.
Figure 2:
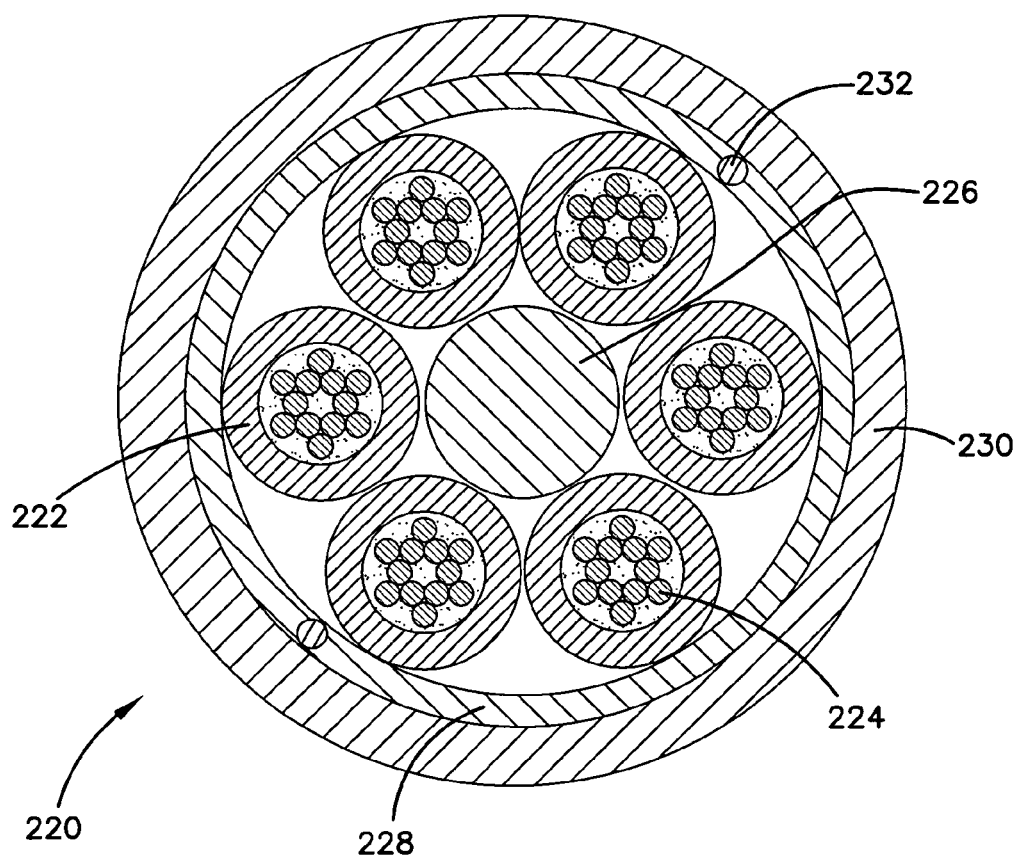
FIG. 2 shows an example of the distribution cable including six separate buffer tubes each containing twelve fibers.

Referring now to the figures in general, a typical distribution cable includes a relatively large number of fibers (e.g., 72, 144 or more fibers). The fibers are typically segregated into separate groups with each group contained within a separate buffer tube. For example, FIG. 2 shows an example of the distribution cable 220 including six separate buffer tubes 222 each containing twelve fibers 224. The buffer tubes 222 may be gel filled. The distribution cable 220 also includes a central strength member 226 for reinforcing the cable 220, and an outer strength member 228 such as Kevlar for also reinforcing the cable. The distribution cable 220 further includes an outer jacket 230 that encloses the buffer tubes 222. Ripcords 232 can be provided for facilitating tearing away portions of the jacket 230 to access the fibers 224 within the jacket 230. While distribution cables typically have a large number of fibers, the various aspects of the present disclosure are also applicable to distribution cables having fewer numbers of fibers (e.g., 2 or more fibers).

A typical mid-span breakout location is provided at an intermediate point along the length of a distribution cable. Commonly a tether (e.g., a drop cable or a stub cable) branches out from the distribution cable at the breakout location. The tether cable most commonly has a fewer number of fibers as compared to the number of fibers provided within the distribution cable. In an example embodiment, the tether has no more than twelve fibers. The tether includes fibers that extend between first and second ends. The first ends of the tether fibers are preferably spliced to selected fibers of the distribution cable at the breakout location. The second ends of the tether fibers can be either connectorized or unconnectorized.

Figure 3:
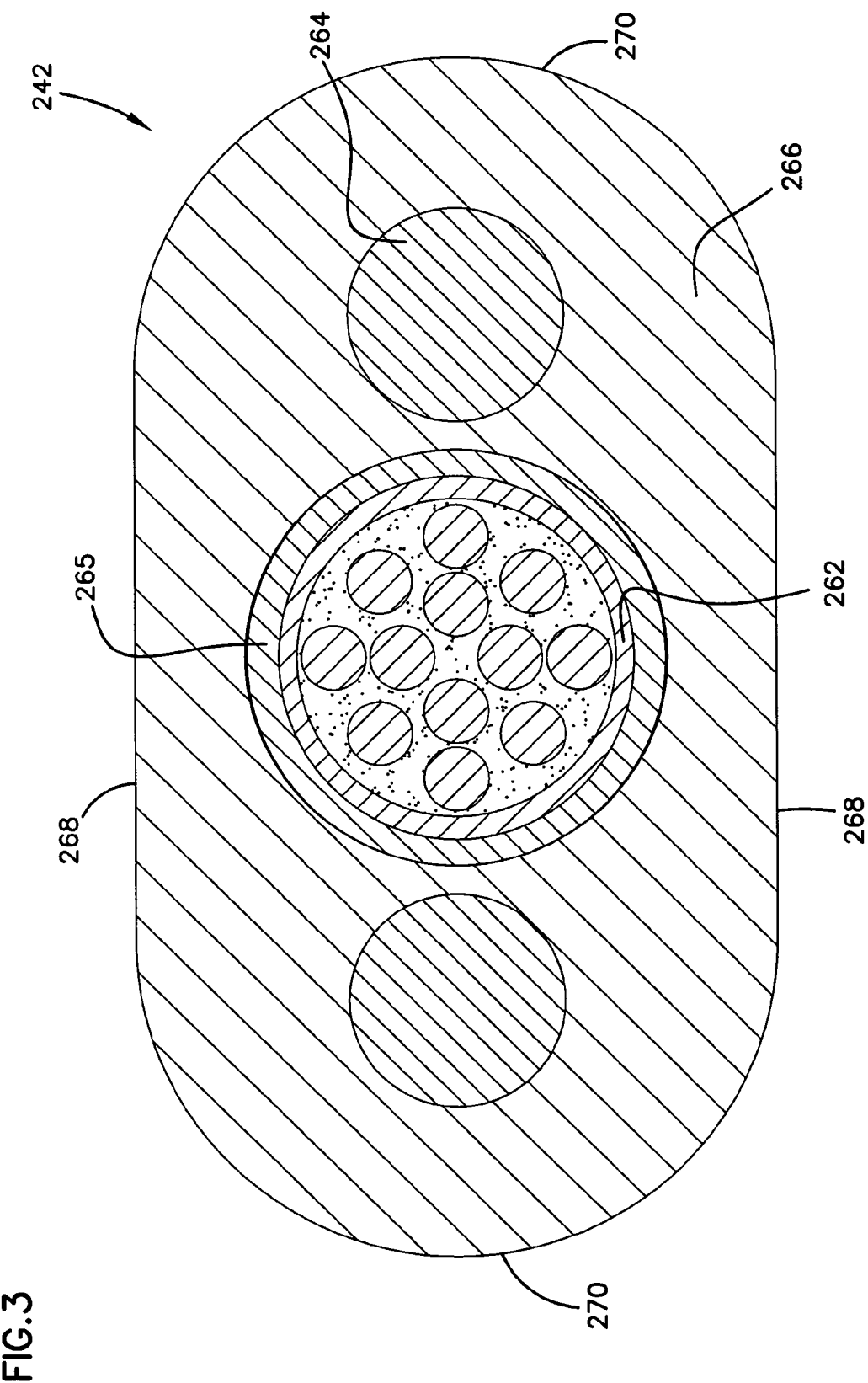
FIG. 3 depicts an example tether as having a flat cable configuration.

For example, FIG. 3 depicts an example tether 242 as having a flat cable configuration. The flat cable configuration includes a central buffer tube 262 containing one to twelve fibers (e.g., either loose or ribbonized). Strength members 264 (e.g., flexible rods formed by glass fiber reinforced epoxy) are positioned on opposite sides of the central buffer tube 262. An outer jacket 266 surrounds the strength members 264 and the buffer tube 262. The outer jacket 266 includes an outer perimeter having an elongated transverse cross-sectional shape. An additional strength layer 265 (e.g., Kevlar) can be positioned between the buffer tube 262 and the outer jacket 266. As shown at FIG. 3, the transverse cross-sectional shape includes oppositely positioned, generally parallel sides 268 interconnected by rounded ends 270.

Figure 4:
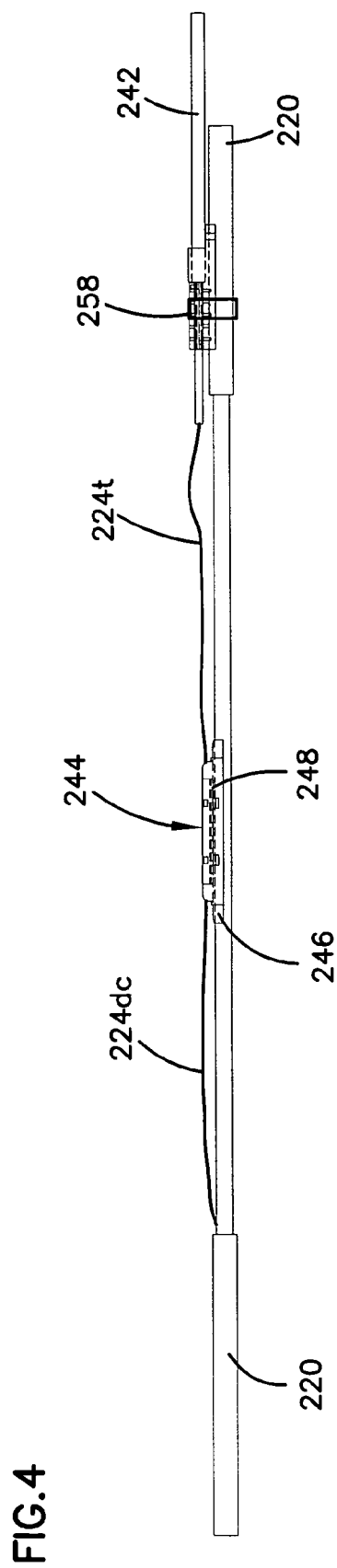
FIG. 4 illustrate a mid-span breakout location on the distribution cable of FIG. 2.

Referring now to FIG. 4, fibers from the tether 242 are connected to fibers from the distribution cable 220 at a mid-span breakout location 241. A breakout assembly 240 is positioned at the mid-span breakout location 241 on the distribution cable 220. A tether 242 branches outwardly from the distribution cable 220 at the mid-span breakout location 241. When the tether 242 is secured to the distribution cable 220, the tether 242 should preferably be able to withstand a pullout force of at least 100 pounds. To meet this pullout force requirement, a retention block 258 is used to strengthen the mechanical interface between the tether 242 and the distribution cable 220.

The breakout location 241 shown in FIG. 4 includes a splice location 244 where selected fibers $224_{dc}$ of the distribution cable 220 (e.g., typically less than twelve fibers) are spliced to corresponding fibers $224_t$ of the tether 242. The breakout assembly 240 includes a splice sleeve 246 positioned over the spliced fibers, and a splice holder 248 configured to secure the splice sleeve 246 to the distribution cable 220.

Figure 5:
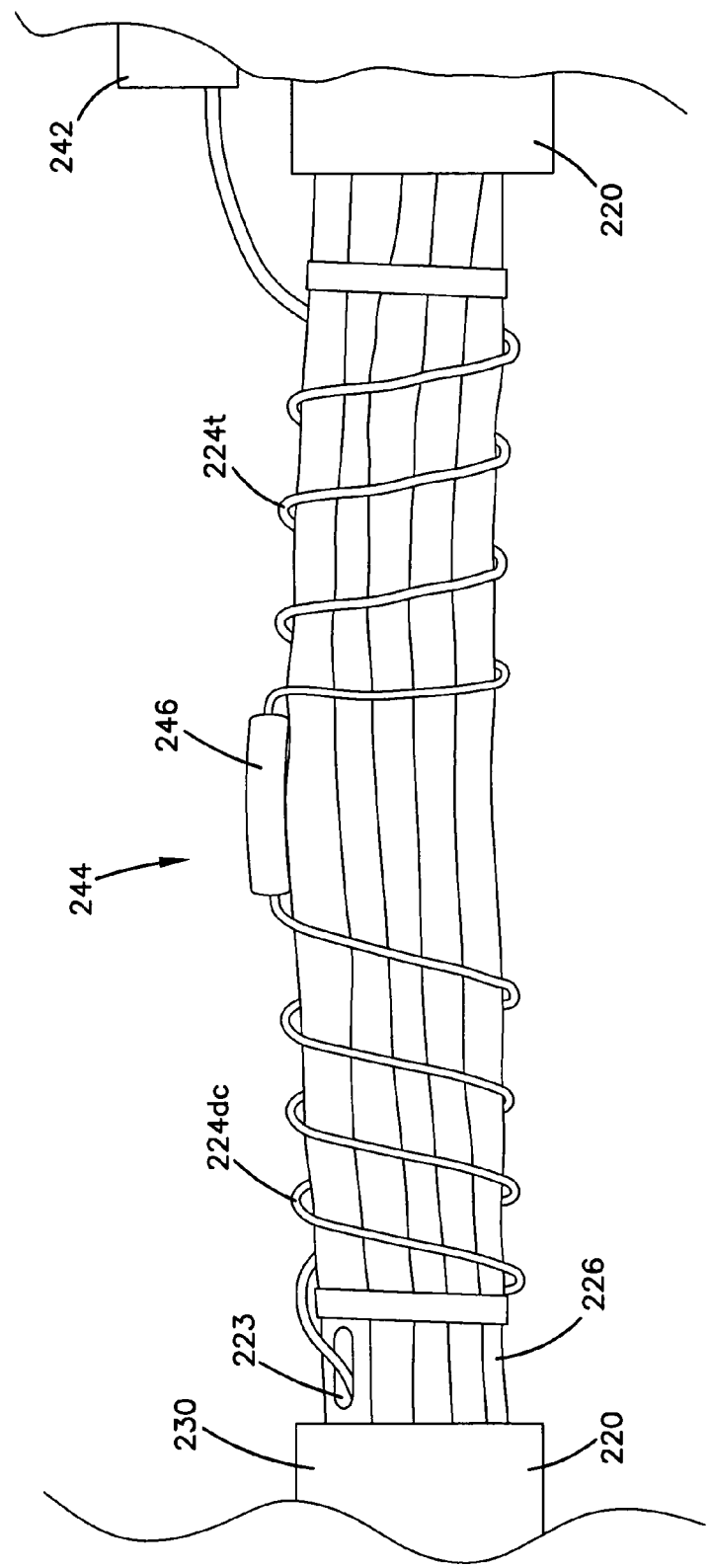
FIG. 5 illustrates optical fibers wrapping around the buffer tubes of the distribution cable at the mid-span breakout location of FIG. 4.
Figure 6:
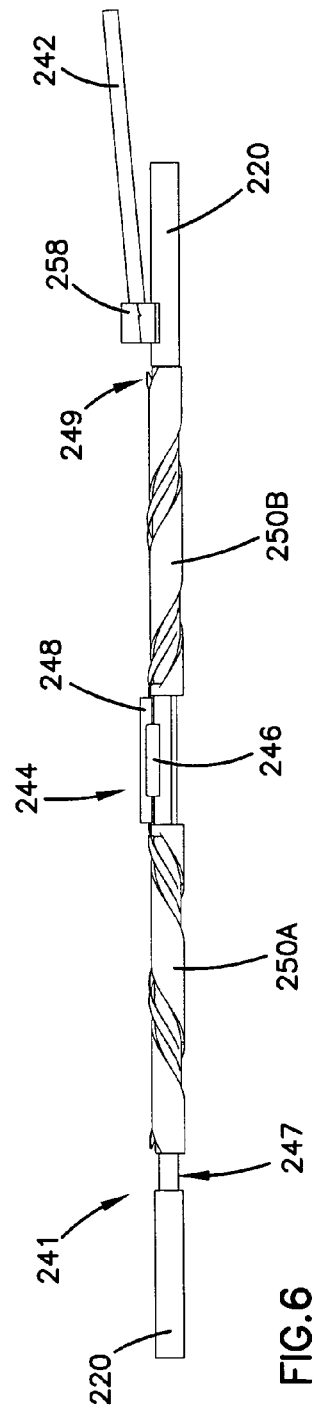
FIG. 6 illustrates the optical fibers wrapping around the buffer tubes of the distribution cable along a helical path in a fiber guide at the mid-span breakout location of FIG. 4.

Referring now to FIGS. 5 and 6, the spliced optical fibers $224_{dc}$, $224_t$ are wrapped around the distribution cable 220 to lessen the fiber path length difference during bending of the distribution cable 220. Wrapping the optical fibers $224_{dc}$, $224_t$ in this way can inhibit fiber breakage and insertion loss. In some embodiments, the optical fibers $224_{dc}$, $224_t$ are helically wrapped around the distribution cable after being connected together. In other embodiments, each set of optical fibers $224_{dc}$, $224_t$ is first wrapped around an appropriate section of the distribution cable 220 and then connected to one another.

In some embodiments, as shown in FIG. 6, the breakout arrangement 240 includes fiber guides 250A, 250B that direct the fibers $224_{dc}$ and $224_t$ to wrap around the distribution cable 220 in a helical pattern. In some embodiments, the fiber guides 250A, 250B include tubes having precut grooves or slits. The grooves or slits extend in a helical or other suitable pattern around the tubes. Examples of materials that can be used to form the fiber guides 250A, 250B include plastic, rubber, polyurethane, polyvinylchloride, resin, and other such suitable materials. In other embodiments, the fiber guides 250A, 250B include strips of material helically wrapped around the distribution cable 220.

Figure 8:
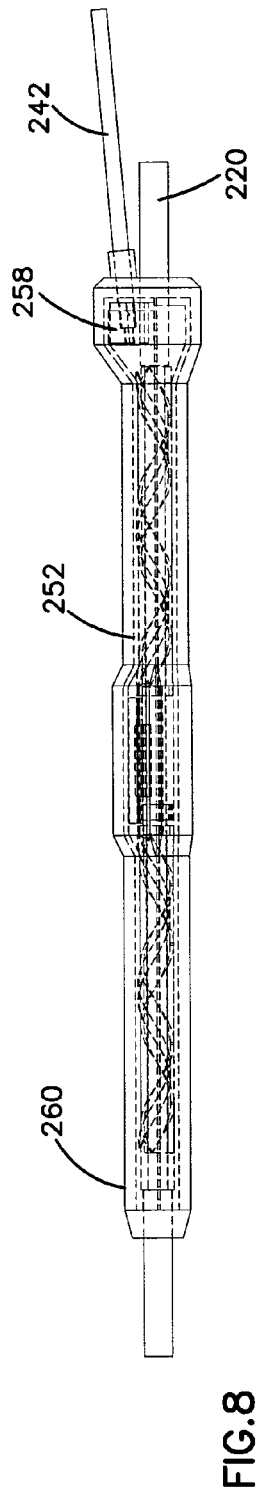
FIG. 8 illustrates an over-mold enclosing and sealing the protective sleeve of FIG. 7.
Figure 7:
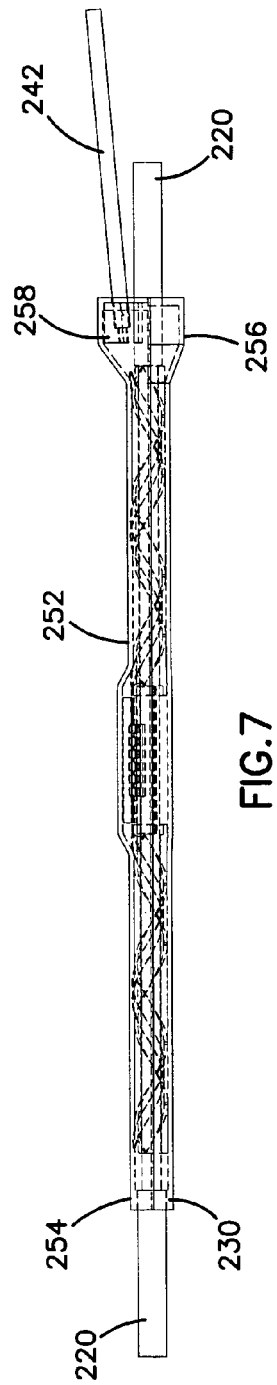
FIG. 7 illustrates a protective sleeve covering the breakout location of FIG. 4.

Referring to FIGS. 7 and 8, the fiber breakout assembly 240 can be sealed and protected from environmental conditions and other contaminants. FIG. 7 illustrates a protective sleeve 252 (e.g., a shell) covering the breakout location 241. The spliced fibers $224_{dc}$, $224_t$ are enclosed within the sleeve 252. In some embodiments, one end 254 of the sleeve 252 overlaps the jacket 230 of the distribution cable 220 and the opposite end 256 of the sleeve 252 overlaps the retention block 258 through which the fibers 224t of the tether 242 pass.

FIG. 8 illustrates an over-mold 260 enclosing and sealing the protective sleeve 252 and the retention block 258. In certain embodiments, a wrap of heat resistant tape can provide an intermediate layer between the protective sleeve 252 and the over-mold 260. The protective sleeve 252 and over-mold layer 260 are preferably sufficiently flexible to allow the pre-terminated cable (i.e., the distribution cable 220 with the tethers terminated 242 thereto) to be readily stored on a spool.

Before leaving the factory or manufacturing plant, the breakout location 241 on the distribution cable 220 can be prepared. First two or more ring cuts are provided on the jacket 230 of the distribution cable 220 for facilitating stripping away a portion of the jacket 230. A buffer tube 222 is then selected and two window cuts are made in the selected buffer tube 222. The upstream window location is then used to sever the number of fibers desired to be broken out. The desired number of fibers is then pulled from the buffer tube 222 at the downstream window location 223 (see FIG. 5).

The fibers $224_{dc}$, $224_t$ can be fused using standard fusion splicing techniques. Once the fibers $224_{dc}$, $224_t$ are spliced together, a splice sleeve 246 can be placed over the splice location 241 to protect the splice. To more evenly distribute the fiber path length along the breakout location 241, the splice sleeve 246 and the optical fibers $224_{dc}$, $224_t$ are wrapped in a helical pattern around the buffer tubes 226 of the distribution cable 220.

In some embodiments, fiber guides 250A, 250B are installed on the distribution cable 220 to aid in winding the fused optical fibers $224_{dc}$, $224_t$. To install the fiber guides 250A, 250B, in some embodiments, the fiber guides 250A, 250B are wound around the distribution cable 220. In one example embodiment, material is wrapped around the distribution cable 220 leaving a helical groove along the length of the breakout location 241. The spliced fibers $224_{dc}$, $224_t$ are laid in the groove by wrapping the splice sleeve 246 around the distribution cable 220. In other embodiments, the distribution cable 220 is fed through tubular fiber guides 250A, 250B until the fiber guides 250A, 250B reach the breakout location 241.

After the splice has been completed and the optical fibers $224_{dc}$, $224_t$ have been helically wrapped around the distribution cable 220, the splice can be secured to the distribution cable 220 with a splice holder 248. Thereafter, a protective sleeve 252 or cover is positioned over the breakout location 241. The protective sleeve 252 is sized to extend across the entire length of exposed distribution cable 220 where the jacket 230 has been removed. A trailing end of the protective sleeve 252 overlaps the retention block 258 and a leading end of the protective sleeve 252 overlaps a jacketed portion of the main distribution cable 220.

Once the protective sleeve 252 has been mounted over the exposed portion of distribution cable 220, a heat resistant or insulating tape can be wrapped around the breakout location 241. Thereafter, an over-molding process can be used to apply a sealing (i.e., or over-mold) layer 260 of polymeric material around the exterior of the breakout location 241. Preferably, the over-mold layer 260 extends from a position forward of the leading end of the protective sleeve 252 to a position rearward of the retention block 258. In this manner, the over-mold layer 260 functions to seal and protect the underlying components of the breakout location 241.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A mid-span breakout arrangement comprising:
a distribution cable having a breakout access location at which an outer jacket of the distribution cable is removed to form a stripped region of the distribution cable;
a tether cable secured to the distribution cable adjacent the breakout access location; and
at least one length of optical fiber helically wrapped around the distribution cable along at least a majority of a length of the stripped region of the breakout access location, the length of optical fiber being optically coupled to the distribution cable and to the tether cable.

2. The arrangement of claim 1, wherein the length of optical fiber includes an optical fiber from the distribution cable fused to an optical fiber from the tether cable.

3. The arrangement of claim 2, further comprising a retention block adapted to strengthen a mechanical interface between the tether cable and the distribution cable.

4. The arrangement of claim 1, further comprising at least one fiber guide installed on the distribution cable, each fiber guide including a helical path along which the length of optical fiber is arranged.

5. The arrangement of claim 4, wherein the fiber guide includes material wrapped around the distribution cable leaving a helical groove along a length of the breakout location.

6. The arrangement of claim 4, wherein the fiber guide includes a tube having a precut groove.

7. The arrangement of claim 1, further comprising a protective sleeve positioned at the breakout location, the protective sleeve enclosing the length of optical fiber.

8. The arrangement of claim 1, further comprising a heat resistant tape wrapped around the breakout access location.

9. The arrangement of claim 1, further comprising a sealing layer of polymeric material applied around an exterior of the breakout access location.

10. A mid-span breakout arrangement comprising:
a distribution cable including a cable jacket and a plurality of buffer tubes positioned within the cable jacket, the plurality of buffer tubes including a first buffer tube, the distribution cable including a breakout location where a portion of the cable jacket has been removed to expose a portion of the buffer tubes and where at least the first buffer tube includes a fiber access location;
a tether that branches from the distribution cable at the breakout location, the tether including a tether buffer tube;
a first length of optical fiber extending out from the fiber access location of the first buffer tube of the distribution cable, the first length of optical fiber being wound helically around an exterior of the portion of the buffer tubes at the breakout location.

11. The mid-span breakout arrangement of claim 10, further comprising:
a second length of optical fiber extending out from the tether buffer tube and being spliced to the first length of optical fiber to form a spliced length of optical fiber extending between the access location on the first buffer tube of the distribution cable and an end of the tether buffer tube, wherein the spliced length of optical fiber is wound helically around the exterior of the portion of the buffer tubes.

12. A mid-span breakout arrangement comprising:
a distribution cable including a cable jacket and a plurality of optical fibers, the distribution cable including a breakout location where a portion of the cable jacket has been removed and where a fiber access location is defined, the plurality of optical fibers including a first optical fiber having a cut end extending out from the fiber access location;
a tether that branches from the distribution cable at the breakout location, the tether including a tether optical fiber that couples to the cut end of the fiber optical fiber of the distribution cable; and
wherein at least an unbuffered portion of the first optical fiber extending out from the fiber access location is wound helically around an exterior of the distribution cable at the breakout location.

13. The mid-span breakout arrangement of claim 12, wherein the optical fiber is spliced to the tether optical fiber.

14. The mid-span breakout arrangement of claim 12, wherein the distribution cable includes at least a first buffer tube arranged within the cable jacket, wherein the first buffer tube encloses the first optical fiber until the cut end of the first optical fiber is removed from the first buffer tube at the fiber access location.

15. The mid-span breakout arrangement of claim 14, wherein the distribution cable includes a plurality of buffer tubes arranged within the cable jacket.

* * * * *